US011386516B2

United States Patent
Jin

(10) Patent No.: US 11,386,516 B2
(45) Date of Patent: Jul. 12, 2022

(54) METHOD OF TRACKING SOURCE DISPLAY PANEL FROM WHICH ILLEGAL COPY OF IMAGE IS CAPTURED BY CAMERA AND ELECTRONIC APPARATUS FOR TRACKING ILLEGAL COPY OF IMAGE CAPTURED BY CAMERA FROM SOURCE DISPLAY PANEL OF ELECTRONIC APPARATUS

(71) Applicant: BOE Technology Group Co., Ltd., Beijing (CN)

(72) Inventor: Liang Jin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 132 days.

(21) Appl. No.: 16/771,566

(22) PCT Filed: Jul. 15, 2019

(86) PCT No.: PCT/CN2019/095994
§ 371 (c)(1),
(2) Date: Jun. 10, 2020

(87) PCT Pub. No.: WO2021/007747
PCT Pub. Date: Jan. 21, 2021

(65) Prior Publication Data
US 2022/0005144 A1 Jan. 6, 2022

(51) Int. Cl.
*G06T 1/00* (2006.01)
*G06F 21/16* (2013.01)
(Continued)

(52) U.S. Cl.
CPC ............ *G06T 1/0028* (2013.01); *G06F 21/16* (2013.01); *G06T 7/0002* (2013.01);
(Continued)

(58) Field of Classification Search
CPC ................. G06T 1/0028; G06T 7/0002; G06T 2201/0064; G06T 2201/0065;
(Continued)

(56) References Cited

U.S. PATENT DOCUMENTS 6,809,792 B1   10/2004 Tehranchi et al.
10,757,292 B1 *  8/2020 Sung .................... H04N 1/3216
(Continued)

FOREIGN PATENT DOCUMENTS

CN    101917611 A    12/2010
CN    105378741 A     3/2016
(Continued)

OTHER PUBLICATIONS

International Search Report & Written Opinion dated Apr. 14, 2020, regarding PCT/CN2019/095994.
(Continued)

*Primary Examiner* — Christopher M Brandt
(74) *Attorney, Agent, or Firm* — Intellectual Valley Law, P.C.

(57) ABSTRACT

A method of tracking a source display panel from which an illegal copy of an image is captured by a camera is provided. The method includes generating a content image visible to human eyes using a visible light component integrated in an integrated light emitting source; generating a watermark image invisible to the human eyes in real time using an invisible light component integrated in the same integrated light emitting source; and simultaneously displaying the content image and the watermark image on the source display panel. Generating the watermark image includes generating an image of an identifier unique to the source display panel. The method further includes analyzing the image captured by the camera to extract the image of an identifier unique to the source display panel; and identifying
(Continued)

the source display panel based on the identifier unique to the source display panel.

18 Claims, 5 Drawing Sheets

(51) Int. Cl.
*G06T 7/00* (2017.01)
*G09G 3/34* (2006.01)

(52) U.S. Cl.
CPC ... *G09G 3/3406* (2013.01); *G06F 2221/0724* (2013.01); *G06T 2201/0064* (2013.01); *G06T 2201/0065* (2013.01); *G06T 2207/10048* (2013.01); *G09G 2358/00* (2013.01)

(58) Field of Classification Search
CPC ........... G06T 2207/10048; G06F 21/16; G06F 2221/0724; G09G 3/3406; G09G 2358/00
See application file for complete search history.

(56) References Cited

U.S. PATENT DOCUMENTS

| | | | | |
|---|---|---|---|---|
| 2014/0366159 | A1* | 12/2014 | Cohen | G06F 21/10 |
| | | | | 726/28 |
| 2015/0220760 | A1* | 8/2015 | Foote | G06F 21/84 |
| | | | | 345/32 |
| 2017/0171615 | A1* | 6/2017 | Xiang | H04N 21/42684 |

FOREIGN PATENT DOCUMENTS

| | | |
|---|---|---|
| CN | 107292180 A | 10/2017 |
| CN | 110520894 A | 11/2019 |

OTHER PUBLICATIONS

Hui Zhang et al, "Transparent Organic Photodetector using a Near-Infrared Absorbing Cyanine Dye", Scientific Reports, 5, Article No. 9439 (2015), https://www.nature.com/articles/srep09439.

* cited by examiner generating a content image visible to human eyes using a visible light component integrated in an integrated light emitting source

generating a watermark image invisible to the human eyes in real time using an invisible light component integrated in the same integrated light emitting source;
wherein generating the watermark image comprises generating an image of an identifier unique to the source display panel; and
the image of the identifier unique to the source display panel is invisible to the human eyes and is recordable by the camera

simultaneously displaying the content image and the watermark image on the source display panel

analyzing the image captured by the camera to extract the image of an identifier unique to the source display panel

identifying the source display panel based on the identifier unique to the source display panel

FIG. 1

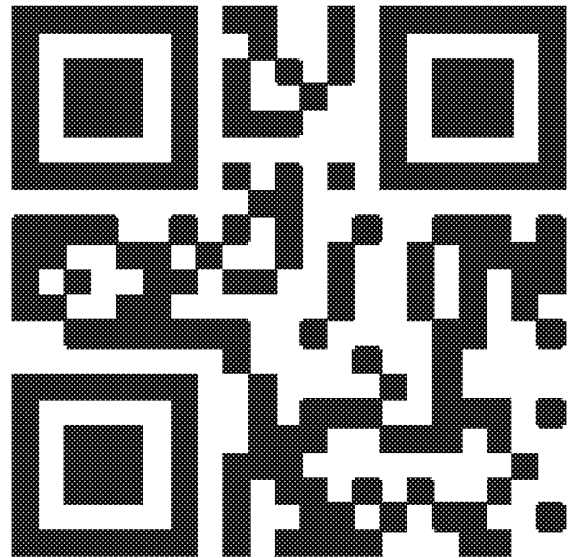

FIG. 2 integrating an invisible light patterned film on the source display panel, the invisible light patterned film comprising a first portion blocking the invisible light and a second portion allowing the invisible light to pass through, the first portion and the second portion forming a pattern corresponding to the invisible light emitting pattern

↓ using the integrated light emitting source having the visible light component and the invisible light component integrated therein as a back light for displaying the content image;
wherein the first portion and the second portion of the invisible light patterned film both allow visible light to pass through; and
the invisible light is blocked by the first portion and passes through the second portion, thereby forming the invisible light emitting pattern containing the image of the identifier unique to the source display panel

FIG. 3

METHOD OF TRACKING SOURCE DISPLAY PANEL FROM WHICH ILLEGAL COPY OF IMAGE IS CAPTURED BY CAMERA AND ELECTRONIC APPARATUS FOR TRACKING ILLEGAL COPY OF IMAGE CAPTURED BY CAMERA FROM SOURCE DISPLAY PANEL OF ELECTRONIC APPARATUS

CROSS-REFERENCE TO RELATED APPLICATION

This application is a national stage application under 35 U.S.C. § 371 of International Application No. PCT/CN2019/095994, filed Jul. 15, 2019, the contents of which are incorporated by reference in the entirety.

TECHNICAL FIELD

The present invention relates to anti-piracy technology, more particularly, to a method of tracking a source display panel from which an illegal copy of an image is captured by a camera and an electronic apparatus for tracking an illegal copy of an image captured by a camera from a source display panel of the electronic apparatus.

BACKGROUND

To protect companies' trade secret and intellectual property (IP), various anti-piracy software and hardware have been developed and installed internally on computers and electronic apparatuses accessible to employees of the company. However, IP theft can occur using low-tech methods such as taking a screen shot of an image displayed on a display panel.

SUMMARY

In one aspect, the present invention provides a method of tracking a source display panel from which an illegal copy of an image is captured by a camera, comprising generating a content image visible to human eyes using a visible light component integrated in an integrated light emitting source; generating a watermark image invisible to the human eyes in real time using an invisible light component integrated in the same integrated light emitting source; and simultaneously displaying the content image and the watermark image on the source display panel; wherein generating the watermark image comprises generating an image of an identifier unique to the source display panel; and the image of the identifier unique to the source display panel is invisible to the human eyes and is recordable by the camera; the method further comprising analyzing the image captured by the camera to extract the image of an identifier unique to the source display panel; and identifying the source display panel based on the identifier unique to the source display panel.

Optionally, the image of the identifier unique to the source display panel comprises a product serial number of the source display panel.

Optionally, the method further comprises determining a location of the source display panel and an authorized user of the source display panel, based on the identifier unique to the source display panel; wherein the image of the identifier unique to the source display panel comprises a location information and an authorized user information.

Optionally, the method further comprises determining a time when the illegal copy of the image was captured and a potential subject present at the time, based on the identifier unique to the source display panel; wherein the image of the identifier unique to the source display panel comprises a time information regarding a time when the illegal copy of the image was captured and a login information of a user of a computer connected to the source display panel at the time when the illegal copy of the image was captured.

Optionally, generating the image of the identifier unique to the source display panel comprises forming an invisible light emitting pattern containing the image of the identifier unique to the source display panel using the integrated light emitting source.

Optionally, forming the invisible light emitting pattern comprises integrating an invisible light patterned film on the source display panel, the invisible light patterned film comprising a first portion blocking the invisible light and a second portion allowing the invisible light to pass through, the first portion and the second portion forming a pattern corresponding to the invisible light emitting pattern; and using the integrated light emitting source having the visible light component and the invisible light component integrated therein as a back light for displaying the content image; wherein the first portion and the second portion of the invisible light patterned film both allow visible light to pass through; and the invisible light is blocked by the first portion and passes through the second portion, thereby forming the invisible light emitting pattern containing the image of the identifier unique to the source display panel.

Optionally, forming the invisible light emitting pattern comprises controlling multiple invisible light emitting elements in the source display panel to emit light, thereby forming the invisible light emitting pattern containing the image of the identifier unique to the source display panel.

Optionally, prior to controlling the multiple invisible light emitting elements in the source display panel to emit light, the method further comprises determining a specific type of information to be encoded in the image of the identifier unique to the source display panel; and selecting the multiple invisible light emitting elements from a plurality of invisible light emitting elements of the source display panel based on a determination of the specific type of information to be encoded in the image of the identifier unique to the source display panel.

Optionally, the watermark image is an infrared image, and the invisible light component is an infrared light component.

Optionally, the infrared image is a near infrared image, and the infrared light component is a near infrared light component.

In another aspect, the present invention provides an electronic apparatus for tracking an illegal copy of an image captured by a camera from a source display panel of the electronic apparatus, comprising a source display panel; an integrated light emitting source; a memory; and one or more processors; wherein the memory and the one or more processors are connected with each other; and the memory stores computer-executable instructions for controlling the one or more processors to generate a content image visible to human eyes using a visible light component integrated in the integrated light emitting source; generate a watermark image invisible to the human eyes in real time using an invisible light component integrated in the same integrated light emitting source; and simultaneously displaying the content image and the watermark image on the source display panel; wherein the watermark image comprises an image of an identifier unique to the source display panel; the image of the identifier unique to the source display panel is invisible to the human eyes and is recordable by the camera; and the image of an identifier unique to the source display panel can be extracted from the image captured by the camera to identify the source display panel.

Optionally, the image of the identifier unique to the source display panel comprises a product serial number of the source display panel.

Optionally, the image of the identifier unique to the source display panel comprises a location information regarding a location of the source display panel and an authorized user information regarding an authorized user of the source display panel.

Optionally, the image of the identifier unique to the source display panel comprises a time information regarding a time when the illegal copy of the image was captured and a login information of a user of a computer connected to the source display panel at the time when the illegal copy of the image was captured.

Optionally, the source display panel is configured to form an invisible light emitting pattern containing the image of the identifier unique to the source display panel using the integrated light emitting source.

Optionally, the electronic apparatus further comprises an invisible light patterned film integrated on the source display panel, the invisible light patterned film comprising a first portion blocking the invisible light and a second portion allowing the invisible light to pass through, the first portion and the second portion forming a pattern corresponding to the invisible light emitting pattern; and a back light for displaying the content image, the back light comprising the visible light component and the invisible light component integrated therein; wherein the first portion and the second portion of the invisible light patterned film both allow visible light to pass through; and the invisible light is blocked by the first portion and passes through the second portion, thereby forming the invisible light emitting pattern containing the image of the identifier unique to the source display panel.

Optionally, the memory further stores computer-executable instructions for controlling the one or more processors to control multiple invisible light emitting elements in the source display panel to emit light, thereby forming the invisible light emitting pattern containing the image of the identifier unique to the source display panel.

Optionally, the memory further stores computer-executable instructions for controlling the one or more processors to determine a specific type of information to be encoded in the image of the identifier unique to the source display panel; and select the multiple invisible light emitting elements from a plurality of invisible light emitting elements of the source display panel based on a determination of the specific type of information to be encoded in the image of the identifier unique to the source display panel.

Optionally, the watermark image is an infrared image, and the invisible light component is an infrared light component.

Optionally, the infrared image is a near infrared image, and the infrared light component is a near infrared light component.

BRIEF DESCRIPTION OF THE FIGURES

The following drawings are merely examples for illustrative purposes according to various disclosed embodiments and are not intended to limit the scope of the present invention.

FIG. 1 is a flow chart illustrating a method of tracking a source display panel from which an illegal copy of an image is captured by a camera in some embodiments according to the present disclosure.

FIG. 2 shows an example of an image of an identifier unique to a source display panel in some embodiments according to the present disclosure.

FIG. 3 is a flow chart illustrating a method of forming the invisible light emitting pattern in some embodiments according to the present disclosure.

DETAILED DESCRIPTION

Figure 4:
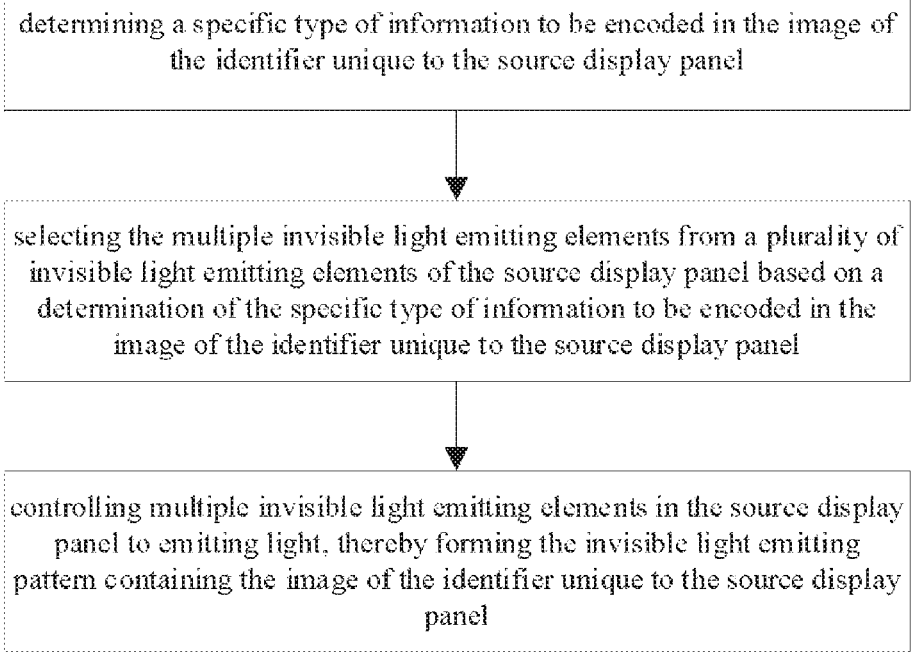
FIG. 4 is a flow chart illustrating a method of forming the invisible light emitting pattern in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Various anti-piracy technologies have been developed to prevent IP theft. However, it remains extremely difficult to track the source of the IP leak if a suspect records an image directly from the computer screen displaying sensitive information.

Accordingly, the present disclosure provides, inter alia, a method of tracking a source display panel from which an illegal copy of an image is captured by a camera and an electronic apparatus for tracking an illegal copy of an image captured by a camera from a source display panel of the electronic apparatus that substantially obviate one or more of the problems due to limitations and disadvantages of the related art. In one aspect, the present disclosure provides a method of tracking a source display panel from which an illegal copy of an image is captured by a camera. FIG. 1 is a flow chart illustrating a method of tracking a source display panel from which an illegal copy of an image is captured by a camera in some embodiments according to the present disclosure. Referring to FIG. 1, the method in some embodiments includes generating a content image visible to human eyes using a visible light component integrated in an integrated light emitting source; generating a watermark image invisible to the human eyes in real time using an invisible light component integrated in the same integrated light emitting source; and simultaneously displaying the content image and the watermark image on the source display panel. Optionally, generating the watermark image includes generating an image of an identifier unique to the source display panel. The image of the identifier unique to the source display panel is invisible to the human eyes and is recordable by the camera. Optionally, the method further includes analyzing the image captured by the camera to extract the image of an identifier unique to the source display panel; and identifying the source display panel based on the identifier unique to the source display panel.

Various identification information may be incorporated into the watermark image. Examples of such information include a product serial number of the source display panel, a location information regarding a location of the source display panel when the illegal copy of an image is captured, an authorized user information regarding an authorized user of the source display panel, a time information regarding a time when the illegal copy of the image was captured, a login information of a user of a computer connected to the source display panel at the time when the illegal copy of the image was captured, and any combination thereof.

Optionally, the method further includes determining a location of the source display panel when the illegal copy of an image is captured based on the identifier unique to the source display panel. Optionally, the method further includes determining an authorized user of the source display panel based on the identifier unique to the source display panel. Optionally, the method further includes determining a time when the illegal copy of the image was captured based on the identifier unique to the source display panel. Optionally, the method further includes determining a potential subject present at the time when the illegal copy of the image was captured based on the identifier unique to the source display panel.

The image of the identifier unique to the source display panel may be presented in various appropriate forms. Examples of appropriate forms of the image of the identifier unique to the source display panel include numbers, letters, patterns, codes, or any form that can uniquely identify the source display panel. FIG. 2 shows an example of an image of an identifier unique to a source display panel in some embodiments according to the present disclosure. Referring to FIG. 2, the image of the identifier unique to the source display panel in some embodiments is a two-dimensional QR code. Optionally, the image of the identifier unique to the source display panel is a result of light modulation, for example, an embedded signal utilizing a high spatial frequency signal. Optionally, the image of the identifier unique to the source display panel is recognizable by a software tailor for recognizing the code contained therein.

In some embodiments, the watermark image is an infrared image, and the invisible light component is an infrared light component. Optionally, the infrared image is a near infrared image, and the infrared light component is a near infrared light component. An infrared refers to a wavelength in a range of 700 nm to 1 mm. A near infrared refers to a wavelength in a range of 0.7 µm to 5.0 µm, e.g., 0.78 µm to 3.0 µm.

In some embodiments, generating the image of the identifier unique to the source display panel includes forming an invisible light emitting pattern containing the image of the identifier unique to the source display panel using the integrated light emitting source. Depending on the types of the source display panel, the invisible light emitting pattern may be formed either by actively controlling invisible light emitting elements of the source display panel, or by passively filtering out portions of invisible light emitting pattern of the source display panel.

FIG. 3 is a flow chart illustrating a method of forming the invisible light emitting pattern in some embodiments according to the present disclosure. Referring to FIG. 3, the method in some embodiments includes integrating an invisible light patterned film on the source display panel, the invisible light patterned film including a first portion blocking the invisible light and a second portion allowing the invisible light to pass through, the first portion and the second portion forming a pattern corresponding to the invisible light emitting pattern; and using the integrated light emitting source having the visible light component and the invisible light component integrated therein as a back light for displaying the content image. The first portion and the second portion of the invisible light patterned film both allow visible light to pass through. The invisible light is blocked by the first portion and passes through the second portion, thereby forming the invisible light emitting pattern containing the image of the identifier unique to the source display panel.

Optionally, the source display panel is a liquid crystal display panel. The back light for illuminating the liquid crystal display panel has the visible light component and the invisible light component integrated therein. The invisible light patterned film is integrated on (e.g., adhered onto the front light emitting surface of) the source display panel.

FIG. 4 is a flow chart illustrating a method of forming the invisible light emitting pattern in some embodiments according to the present disclosure. Referring to FIG. 4, the method in some embodiments includes controlling multiple invisible light emitting elements in the source display panel to emit light, thereby forming the invisible light emitting pattern containing the image of the identifier unique to the source display panel. Optionally, prior to controlling the multiple invisible light emitting elements in the source display panel to emit light, the method further includes determining a specific type of information to be encoded in the image of the identifier unique to the source display panel; and selecting the multiple invisible light emitting elements from a plurality of invisible light emitting elements of the source display panel based on a determination of the specific type of information to be encoded in the image of the identifier unique to the source display panel.

Optionally, the source display panel is an organic light emitting diode display panel. The organic light emitting diode display panel includes a plurality of visible light emitting diodes and a plurality of invisible light emitting diodes.

Figure 5:
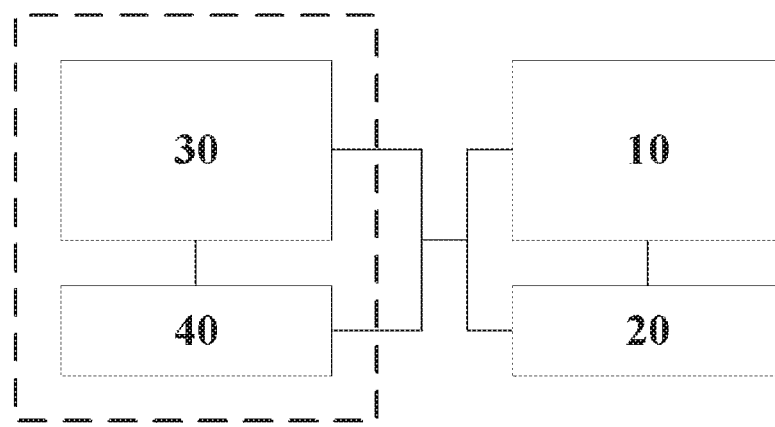
FIG. 5 is a schematic diagram illustrating the structure of an electronic apparatus for tracking an illegal copy of an image captured by a camera from a source display panel of the electronic apparatus in some embodiments according to the present disclosure.

In another aspect, the present disclosure further provides an electronic apparatus for tracking an illegal copy of an image captured by a camera from a source display panel of the electronic apparatus. FIG. 5 is a schematic diagram illustrating the structure of an electronic apparatus for tracking an illegal copy of an image captured by a camera from a source display panel of the electronic apparatus in some embodiments according to the present disclosure. Referring to FIG. 5, in some embodiments, the electronic apparatus includes a source display panel 10, an integrated light emitting source 20, a memory 30, and one or more processors 40. The memory 30 and the one or more processors 40 are connected with each other. The memory 30 stores computer-executable instructions for controlling the one or more processors 40 to generate a content image visible to human eyes using a visible light component integrated in the integrated light emitting source; generate a watermark image invisible to the human eyes in real time using an invisible light component integrated in the same integrated light emitting source; and simultaneously displaying the content image and the watermark image on the source display panel. Optionally, the watermark image includes an image of an identifier unique to the source display panel. The image of the identifier unique to the source display panel is invisible to the human eyes and is recordable by the camera. The image of an identifier unique to the source display panel can be extracted from the image captured by the camera to identify the source display panel.

In some embodiments, the source display panel 10 is configured to form an invisible light emitting pattern containing the image of the identifier unique to the source display panel 10 using the integrated light emitting source 20. Depending on the types of the source display panel 10, the invisible light emitting pattern may be formed either by actively controlling invisible light emitting elements of the source display panel 10, or by passively filtering out portions of invisible light emitting pattern of the source display panel 10.

Figure 6:
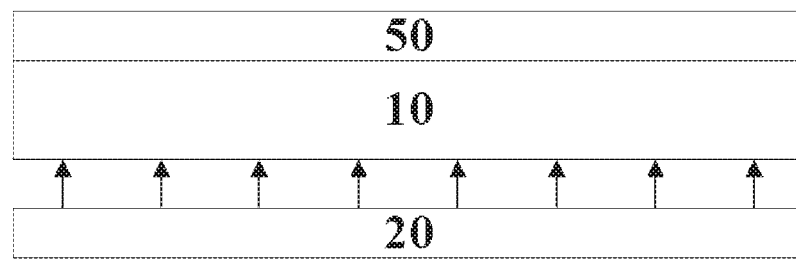
FIG. 6 is a schematic diagram illustrating the structure of an electronic apparatus for tracking an illegal copy of an image captured by a camera from a source display panel of the electronic apparatus in some embodiments according to the present disclosure.
Figure 7:
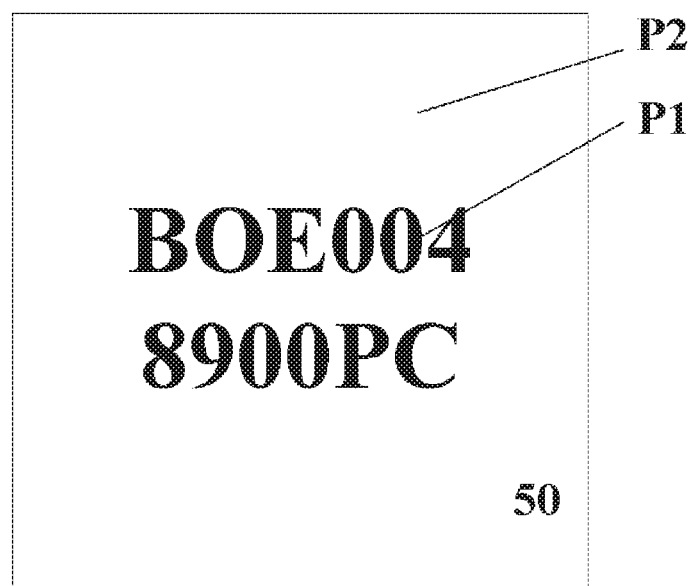
FIG. 7 illustrates a first portion and a second portion of an invisible light patterned film in some embodiments according to the present disclosure.

FIG. 6 is a schematic diagram illustrating the structure of an electronic apparatus for tracking an illegal copy of an image captured by a camera from a source display panel of the electronic apparatus in some embodiments according to the present disclosure. Referring to FIG. 6, in some embodiments, the electronic apparatus further includes an invisible light patterned film 50 integrated on the source display panel 10. FIG. 7 illustrates a first portion and a second portion of an invisible light patterned film in some embodiments according to the present disclosure. Referring to FIG. 7, the invisible light patterned film 50 in some embodiments includes a first portion P1 capable of blocking the invisible light and a second portion P2 allowing the invisible light to pass through. The first portion P1 and the second portion P2 form a pattern corresponding to the invisible light entitling pattern. As shown in FIG. 7 as an example, the first portion P1 and the second portion P2 form a pattern corresponding to an image of identifier "BOE0048900PC" unique to the source display panel. For example, the identifier "BOE0048900PC" may be a product serial number of the source display panel. Optionally, the first portion P1 and the second portion P2 of the invisible light patterned film 50 both allow visible light to pass through.

Optionally, the first portion P1 includes an invisible light absorbing material, and the second portion P2 includes a material different from the material of the first portion P1. Optionally, the second portion P2 does not include an invisible light absorbing material. Optionally, the second portion P2 includes a material having less degree of invisible light absorbance property. Examples of invisible light absorbing materials for forming the first portion P1 include nano-particles (e.g., infra-red light absorbing nano-particles) and various infra-red light dyes such as Cy-7, Cy-7.5, Cy-7T, phthalocyanine, squarylium, diimonium, dithiolene complex, cyanine, Bis[4,4'-dimethoxy(dithiobenzil)]nickel (II), Bis(4-dimethylaminodithiobenzil)nickel(II), IR-813 p-Toluenesulfonate, Copper(II) 5,9,14,18,23,27,32,36-Octabutoxy-2,3-naphthalocyanine, 3,3'-Diethylthiatricarbocyanine Iodide, 1,1'-Dibutyl-3,3,3',3'-tetramethylindotricarbocyanine Hexafluorophosphate, Indocyanine Green, Tetrabutylammonium Bis(3,6-dichloro-1,2-benzenedithiolato)nickelate, Tetrabutylammonium Bis(3,4,6-trichloro-1,2-benzenedithiolato)nickelate, and Tetrabutylammonium Bis(4-methyl-1,2-benzenedithiolato)nickelate.

Referring to FIG. 6 and FIG. 7, in some embodiments, the integrated light emitting source 20 having the visible light component and the invisible light component integrated therein is used as a back light for displaying the content image. Invisible light emitted from the back light is blocked by the first portion P1 and passes through the second portion P2, thereby forming the invisible light emitting pattern containing the image of the identifier unique to the source display panel 10.

Figure 8:
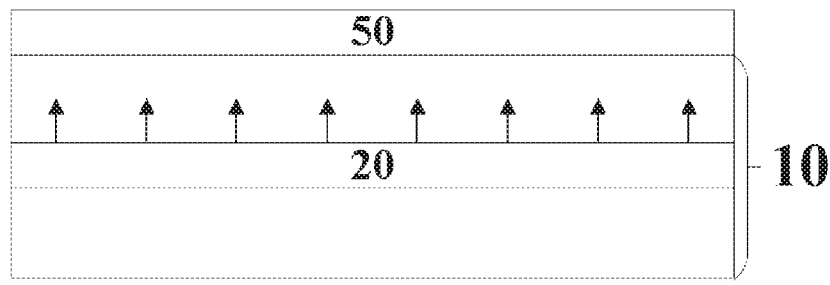
FIG. 8 is a schematic diagram illustrating the structure of an electronic apparatus for tracking an illegal copy of an image captured by a camera from a source display panel of the electronic apparatus in some embodiments according to the present disclosure.

In some embodiments, the integrated light emitting source 20 is integrated as a part of the source display panel 10. FIG. 8 is a schematic diagram illustrating the structure of an electronic apparatus for tracking an illegal copy of an image captured by a camera from a source display panel of the electronic apparatus in some embodiments according to the present disclosure. Referring to FIG. 8, the source display panel 10 is a self-emitting display panel such as an organic light emitting diode display panel having a plurality of light emitting elements.

Figure 9:
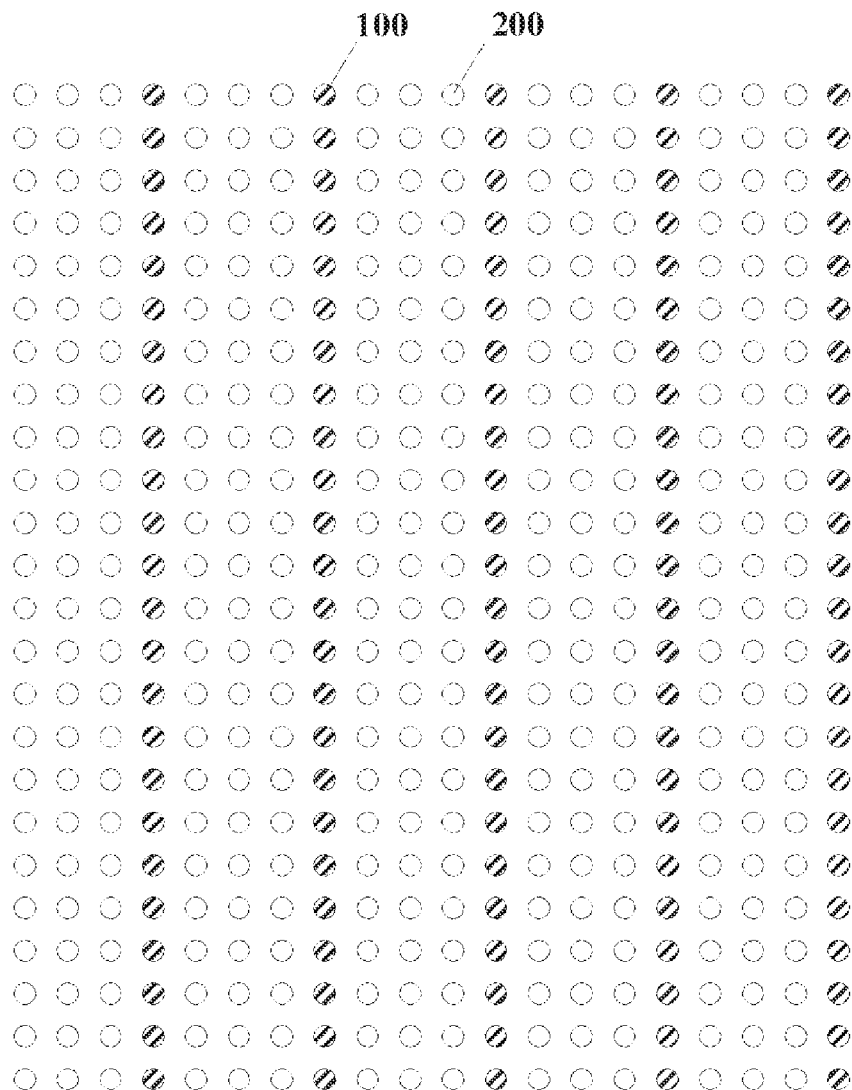
FIG. 9 illustrates a plurality of visible light emitting elements and a plurality of invisible light emitting elements in an integrated light emitting source in some embodiments according to the present disclosure.

FIG. 9 illustrates a plurality of visible light emitting elements and a plurality of invisible light emitting elements in an integrated light emitting source in some embodiments according to the present disclosure. Referring to FIG. 9, the integrated light emitting source 20 includes a plurality of invisible light emitting elements 100 and a plurality of visible light emitting elements 200. Referring to FIG. 5. FIG. 8, and FIG. 9, in some embodiments, the memory further stores computer-executable instructions for controlling the one or more processors 40 to control multiple invisible light emitting elements of the plurality of invisible light emitting elements 100 in the source display panel 10 to emit invisible light, thereby forming the invisible light emitting pattern containing the image of the identifier unique to the source display panel 10. Optionally, the memory further stores computer-executable instructions for controlling the one or more processors to determine a specific type of information to be encoded in the image of the identifier unique to the source display panel 10; and select the multiple invisible light emitting elements from the plurality of invisible light emitting elements 100 of the source display panel 10 based on a determination of the specific type of information to be encoded in the image of the identifier unique to the source display panel 10.

In another aspect, the present disclosure further provides an invisible light patterned film for tracking an illegal copy of an image captured by a camera from a source display panel of the electronic apparatus. In some embodiments, and referring to FIG. 7, the invisible light patterned film 50 includes a first portion P1 capable of blocking the invisible light and a second portion P2 allowing the invisible light to pass through. The first portion P1 and the second portion P2 form a pattern corresponding to the invisible light emitting pattern which in turn corresponding to an image of an identifier unique to the source display panel 10.

FIG. 6 is a schematic diagram illustrating the structure of an electronic apparatus for tracking an illegal copy of an image captured by a camera from a source display panel of the electronic apparatus in some embodiments according to the present disclosure. Referring to FIG. 6, in some embodiments, the electronic apparatus further includes an invisible light patterned film 50 integrated on the source display panel 10. FIG. 7 illustrates a first portion and a second portion of an invisible light patterned film in some embodiments according to the present disclosure. Referring to FIG. 7, the invisible light patterned film 50 in some embodiments includes a first portion P1 capable of blocking the invisible light and a second portion P2 allowing the invisible light to pass through. The first portion P1 and the second portion P2 form a pattern corresponding to the invisible light emitting pattern which in turn corresponding to an image of an identifier unique to the source display panel 10.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of tracking a source display panel from which an illegal copy of an image is captured by a camera, comprising:
   generating a content image visible to human eyes using a visible light component integrated in an integrated light emitting source;
   generating a watermark image invisible to the human eyes in real time using an invisible light component integrated in the same integrated light emitting source; and
   simultaneously displaying the content image and the watermark image on the source display panel;
   wherein generating the watermark image comprises generating an image of an identifier unique to the source display panel; and
   the image of the identifier unique to the source display panel is invisible to the human eyes and is recordable by the camera;
   the method further comprising:
   analyzing the image captured by the camera to extract the image of an identifier unique to the source display panel;
   identifying the source display panel based on the identifier unique to the source display panel; and
   forming an invisible light emitting pattern containing the image of the identifier unique to the source display panel using the integrated light emitting source by:
   integrating an invisible light patterned film on the source display panel, the invisible light patterned film comprising a first portion blocking the invisible light and a second portion allowing the invisible light to pass through, the first portion and the second portion forming a pattern corresponding to the invisible light emitting pattern; and
   using the integrated light emitting source having the visible light component and the invisible light component integrated therein as a back light for displaying the content image;
   wherein the first portion and the second portion of the invisible light patterned film both allow visible light to pass through; and
   the invisible light is blocked by the first portion and passes through the second portion, thereby forming the invisible light emitting pattern containing the image of the identifier unique to the source display panel.

2. The method of claim 1, wherein the image of the identifier unique to the source display panel comprises a product serial number of the source display panel.

3. The method of claim 1, further comprising determining a location of the source display panel and an authorized user of the source display panel, based on the identifier unique to the source display panel;
   wherein the image of the identifier unique to the source display panel comprises a location information and an authorized user information.

4. The method of claim 1, further comprising determining a time when the illegal copy of the image was captured and a potential subject present at the time, based on the identifier unique to the source display panel;
   wherein the image of the identifier unique to the source display panel comprises a time information regarding a time when the illegal copy of the image was captured and a login information of a user of a computer connected to the source display panel at the time when the illegal copy of the image was captured.

5. The method of claim 1, wherein generating the image of the identifier unique to the source display panel comprises forming an invisible light emitting pattern containing the image of the identifier unique to the source display panel using the integrated light emitting source.

6. The method of claim 5, wherein forming the invisible light emitting pattern comprises:
   controlling multiple invisible light emitting elements in the source display panel to emit light, thereby forming the invisible light emitting pattern containing the image of the identifier unique to the source display panel.

7. The method of claim 6, prior to controlling the multiple invisible light emitting elements in the source display panel to emit light, further comprising:
   determining a specific type of information to be encoded in the image of the identifier unique to the source display panel; and
   selecting the multiple invisible light emitting elements from a plurality of invisible light emitting elements of the source display panel based on a determination of the specific type of information to be encoded in the image of the identifier unique to the source display panel.

8. The method of claim 1, wherein the watermark image is an infrared image, and the invisible light component is an infrared light component.

9. The method of claim 8, wherein the infrared image is a near infrared image, and the infrared light component is a near infrared light component.

10. An electronic apparatus for tracking an illegal copy of an image captured by a camera from a source display panel of the electronic apparatus, comprising:
    a source display panel;

an integrated light emitting source;
a memory; and
one or more processors;
wherein the memory and the one or more processors are connected with each other; and
the memory stores computer-executable instructions for controlling the one or more processors to:
generate a content image visible to human eyes using a visible light component integrated in the integrated light emitting source;
generate a watermark image invisible to the human eyes in real time using an invisible light component integrated in the same integrated light emitting source; and
simultaneously displaying the content image and the watermark image on the source display panel;
wherein the watermark image comprises an image of an identifier unique to the source display panel;
the image of the identifier unique to the source display panel is invisible to the human eyes and is recordable by the camera; and
the image of an identifier unique to the source display panel is extracted from the image captured by the camera to identify the source display panel;
wherein the electronic apparatus further comprises:
an invisible light patterned film integrated on the source display panel, the invisible light patterned film comprising a first portion blocking the invisible light and a second portion allowing the invisible light to pass through, the first portion and the second portion forming a pattern corresponding to the invisible light emitting pattern; and
a back light for displaying the content image, the back light comprising the visible light component and the invisible light component integrated therein;
wherein the first portion and the second portion of the invisible light patterned film both allow visible light to pass through; and
the invisible light is blocked by the first portion and passes through the second portion, thereby forming the invisible light emitting pattern containing the image of the identifier unique to the source display panel.

11. The electronic apparatus of claim 10, wherein the image of the identifier unique to the source display panel comprises a product serial number of the source display panel.

12. The electronic apparatus of claim 10, wherein the image of the identifier unique to the source display panel comprises a location information regarding a location of the source display panel and an authorized user information regarding an authorized user of the source display panel.

13. The electronic apparatus of claim 10, wherein the image of the identifier unique to the source display panel comprises a time information regarding a time when the illegal copy of the image was captured and a login information of a user of a computer connected to the source display panel at the time when the illegal copy of the image was captured.

14. The electronic apparatus of claim 10, wherein the source display panel is configured to form an invisible light emitting pattern containing the image of the identifier unique to the source display panel using the integrated light emitting source.

15. The electronic apparatus of claim 14, wherein the memory further stores computer-executable instructions for controlling the one or more processors to control multiple invisible light emitting elements in the source display panel to emit light, thereby forming the invisible light emitting pattern containing the image of the identifier unique to the source display panel.

16. The electronic apparatus of claim 15, wherein the memory further stores computer-executable instructions for controlling the one or more processors to:
determine a specific type of information to be encoded in the image of the identifier unique to the source display panel; and
select the multiple invisible light emitting elements from a plurality of invisible light emitting elements of the source display panel based on a determination of the specific type of information to be encoded in the image of the identifier unique to the source display panel.

17. The electronic apparatus of claim 10, wherein the watermark image is an infrared image, and the invisible light component is an infrared light component.

18. The electronic apparatus of claim 17, wherein the infrared image is a near infrared image, and the infrared light component is a near infrared light component.

* * * * *